Figure 1:
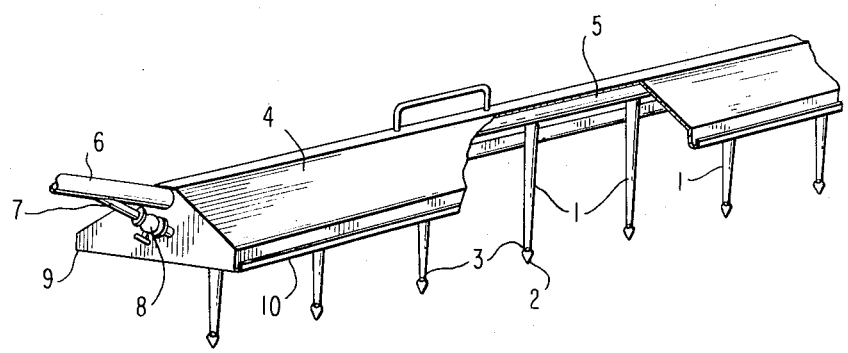

United States Patent
Björheim et al.

[11] 3,762,171
[45] Oct. 2, 1973

[54] GROUND HEATER

[76] Inventors: Ingolf Björheim, Verdalen, Kleppe; Brynjulf Steinsöy, Eikeveien 28, Sandnes, both of Norway

[22] Filed: Nov. 3, 1971

[21] Appl. No.: 195,083

[30] Foreign Application Priority Data
Nov. 3, 1970 Norway.............................. 4175/70

[52] U.S. Cl................ 61/36 A, 47/48.5, 126/271.1, 111/6
[51] Int. Cl............................................. E02d 3/00
[58] Field of Search........................ 61/36 A; 111/6; 126/271.1; 47/48.5; 52/588

[56] References Cited
UNITED STATES PATENTS

| | | | |
|---|---|---|---|
| 392,844 | 11/1888 | Best..................................... | 61/36 A |
| 620,402 | 2/1899 | Anderson............................. | 61/36 A |
| 620,112 | 2/1899 | Elliott................................... | 61/36 A |
| 1,021,529 | 3/1912 | Johnson............................... | 111/6 X |
| 1,021,530 | 3/1912 | Johnson............................... | 111/6 X |
| 1,131,378 | 3/1915 | Hill....................................... | 126/271.1 |
| 3,394,524 | 7/1968 | Howarth............................... | 52/588 |
| 3,606,718 | 9/1971 | Curran.................................. | 52/588 |
| 3,621,799 | 11/1971 | Erga..................................... | 111/6 |

OTHER PUBLICATIONS

"Spike-Harrow Steam Soil Steriliser" in Farm Implement and Machinery Review, page 820, Feb. 1, 1944.

Primary Examiner—Mervin Stein
Assistant Examiner—Alex Grosz
Attorney—Irvin S. Thompson et al.

[57] ABSTRACT

A ground heater applies steam to and beneath the surface of the soil through a plurality of parallel vertical conical pipes having pointed lower ends and steam outlets adjacent the lower ends. The pipes are fed from a common horizontal manifold which is disposed at the upper underside of an elongated hood. A separate steam conduit supplies steam outside the pipes and under the hood. The edges of the hood have interfitting flanges for interconnecting a plurality of heaters side-by-side.

4 Claims, 2 Drawing Figures

GROUND HEATER

The present invention relates to ground heaters of the type for heating the soil and/or thawing frozen soil.

It is an object of the present invention to provide a ground heater of the type that utilizes steam, in which steam is conserved and more effectively used.

Another object of the present invention is the provision of a ground heater which applies steam both to the surface of the ground and beneath the surface of the ground.

Still another object of the present invention is the provision of a ground heater of the type that penetrates the soil, and which has good heat exchange contact with the soil.

Still another object of the present invention is the provision of a ground heater that is readily interconnectible with other similar ground heaters in side-by-side relationship to treat a larger area of soil.

Finally, it is an object of the present invention to provide a ground heater which will be relatively simple and inexpensive to manufacture, easy to operate, maintain and repair, and rugged and durable in use.

Figure 2:
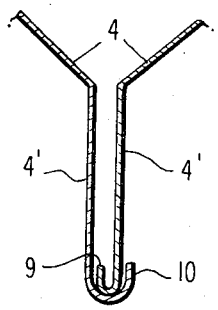

Other objects, features and advantages of the present invention will become apparent from a consideration of the following description, taken in connection with the accompanying drawing, in which:

FIG. 1 is a perspective view, with parts broken away, of a ground heater according to the present invention; and FIG. 2 is an enlarged fragmentary cross-sectional view of the edges of the hoods of two adjacent ground heaters according to the present invention, assembled in side-by-side relation.

Referring now to the drawing in greater detail, there is shown a ground heater according to the present invention, comprising a plurality of parallel vertical pipes for conveying steam beneath the surface of the ground. Each pipe 1 is conical in a downwardly converging direction, and terminates downwardly in a point 2 for facilitating the penetration of the soil. Openings 3 extend through the side walls of pipes 1 closely adjacent points 2.

The upper side of the heater is closed by a downwardly opening elongated hood 4 which is closed at both ends and serves as a steam jacket. A horizontal manifold conduit 5 extends along the top of the underside of hood 4. It is to be noted that the side walls of hood 4 are inclined downwardly outwardly from the apex of the hood along manifold conduit 5.

A supply conduit 6 communicates with and supplies steam to manifold conduit 5, which in turn supplies steam to each of the vertical pipes 1. Supply conduit 6 is attached at one end to manifold conduit 5, at one end of hood 4. At this same end of hood 4, a branch pipe 7 controlled by a valve 8 supplies steam from supply conduit 6 to the underside of hood 4, outside the manifold conduit 5 and pipes 1.

As will be seen from a comparison of FIGS. 1 and 2, the downwardly outwardly inclined side walls of hood 4 terminate downwardly in vertical walls 4' which in turn terminate downwardly in flanges 9 and 10, the flange 10 being disposed along one side edge of hood 4 and the flange 9 being disposed along the other side edge of hood 4. Flanges 9 and 10 are bent out and then up, about different radii of curvature, the radius of flange 9 being smaller than that of flange 10 so that flange 9 of one hood 4 nests within the flange 10 of an adjacent hood 4. Thus the heaters are interconnectible in side-by-side relation.

The heater of the present invention is useful not only to heat loose soil, but also to thaw frozen soil. The mode of use varies slightly, according to which operation is to be performed.

To thaw frozen soil, the points 2 are forced into the frozen ground a very short distance if any distance. Thereafter steam is supplied through conduit 6, through manifold conduit 5 and into the pipes 1, so that the pipes 1 and their points 2 are heated, whereupon the soil adjacent the points 2 will be thawed and the points 2 can be forced a greater distance into the ground. This operation is repeated until the pipes 1 are fully in the ground, that is, until the flanges 9 and 10 rest on the ground or on the flanges of adjacent heaters. Then the valve 8 is opened so that steam flows through the pipe 7 to the underside of the hood outside the pipes 1. Steam is thus applied to the surface of the ground at the same time that steam is forced into the ground beneath the surface, so that the escape of steam from beneath the surface is retarded and the underground steam gives up more of its heat to the soil. At the same time, the surface steam penetrates beneath the surface and augments the underground work of the steam that passes through openings 3 into the soil.

On the other hand, if the ground is already thawed, that is, the soil is initially loose, then the pipes 1 can be forced down to their full depth in one operation instead of stepwise or progressively and the steam through manifold conduit 5 and branch pipe 7 can be applied to the soil from the beginning.

In either case, the conical taper of the pipes 1 ensures that the pipes will be in good heat exchange contact with the ground, whether the ground is loose or frozen.

From a consideration of the foregoing disclosure, therefore, it will be evident that all of the initially recited objects of the present invention have been achieved.

Although the present invention has been described and illustrated in connection with a preferred embodiment, it is to be understood that modifications and variations may be resorted to without departing from the spirit of the invention, as those skilled in this art will readily understand. Such modifications and variations are considered to be within the purview and scope of the present invention as defined by the appended claims.

We claim:

1. A ground heater comprising a plurality of parallel vertical pipes, means at the lower ends of the pipes for penetrating the soil, means adjacent said penetrating means for emitting steam from within the pipes, manifold conduit means for simultaneously supplying steam to said plurality of pipes, a downwardly opening elongated hood that surmounts said pipes, and a branch conduit for admitting steam to the underside of said hood outside said pipes when said manifold conduit means supplies steam to said pipes so that steam is applied beneath the hood to the surface of the ground at the same time that steam is forced underground through the pipes so that the escape of steam from beneath the surface of the ground is retarded.

2. A heater as claimed in claim 1, said manifold conduit means being disposed on the underside of said hood.

3. A heater as claimed in claim 1, said pipes being tapered from a least diameter adjacent their lower end to a greatest diameter adjacent their upper end.

4. A heater as claimed in claim 1, said hood having flanges along its lower side edges, the flange along one side of said hood nesting with the flange along the other side of an adjacent hood so that adjacent hoods of plural said heaters interfit.

* * * * *